United States Patent
Bacon

[11] Patent Number: 6,120,426
[45] Date of Patent: Sep. 19, 2000

[54] APPARATUS FOR FORMING AN OUTWARDLY-ROLLED LIP ON A CYLINDRICAL CONTAINER BODY

[75] Inventor: John Ellis Bacon, Hartsville, S.C.

[73] Assignee: Sonoco Development, Inc., Hartsville, S.C.

[21] Appl. No.: 09/255,259

[22] Filed: Feb. 22, 1999

[51] Int. Cl.[7] ................................................. B31B 01/90
[52] U.S. Cl. ........................ 493/109; 493/105; 493/158; 413/71
[58] Field of Search .................................... 493/105, 109, 493/158, 159; 413/69–71

[56] References Cited

U.S. PATENT DOCUMENTS

| | | |
|---|---|---|
| 746,843 | 12/1903 | Jones . |
| 2,564,193 | 8/1951 | DeLaval . |
| 2,802,407 | 8/1957 | Majer . |
| 2,925,757 | 2/1960 | Wilson . |
| 3,195,426 | 7/1965 | Bauer ................................. 493/158 |
| 3,229,595 | 1/1966 | Waycie ............................... 493/158 |
| 3,336,847 | 8/1967 | Durat . |
| 3,343,465 | 9/1967 | Albert . |
| 3,468,225 | 9/1969 | Pesch et al. ....................... 493/158 |
| 3,882,763 | 5/1975 | Ellerbrock et al. ................ 493/158 |
| 4,034,657 | 7/1977 | Boussageon . |
| 4,070,953 | 1/1978 | Richards et al. .................. 493/158 |
| 4,238,949 | 12/1980 | Roper . |
| 4,349,345 | 9/1982 | Bodendoerfer . |
| 4,386,576 | 6/1983 | Johnson . |
| 4,392,295 | 7/1983 | Sasai et al. . |
| 4,452,596 | 6/1984 | Clauss et al. . |
| 4,490,130 | 12/1984 | Konzal et al. . |
| 4,531,930 | 7/1985 | Clauss . |
| 4,543,025 | 9/1985 | Tsukamura . |
| 4,546,911 | 10/1985 | Clauss . |
| 4,560,063 | 12/1985 | Muller . |
| 4,571,233 | 2/1986 | Konzal . |
| 4,596,620 | 6/1986 | Karolyi . |
| 4,610,655 | 9/1986 | Muller . |
| 4,667,499 | 5/1987 | Bull . |
| 4,667,844 | 5/1987 | Clauss . |
| 4,680,016 | 7/1987 | Lynch . |
| 5,029,749 | 7/1991 | Aloisi . |
| 5,120,294 | 6/1992 | Segars et al. . |
| 5,135,462 | 8/1992 | Stahlecker et al. . |
| 5,184,995 | 2/1993 | Kuchenbecker .................. 493/158 |
| 5,431,619 | 7/1995 | Bacon et al. . |
| 5,472,402 | 12/1995 | Aloisi et al. ....................... 493/158 |
| 5,954,624 | 9/1999 | Sandstrom ......................... 493/158 |
| 5,992,489 | 11/1999 | Busse ................................. 493/158 |

FOREIGN PATENT DOCUMENTS

| | | |
|---|---|---|
| 363845 | 12/1931 | United Kingdom . |

*Primary Examiner*—Eugene Kim
*Attorney, Agent, or Firm*—Alston & Bird LLP

[57] ABSTRACT

An apparatus is provided for forming an outwardly-rolled lip on an open end of a deformable cylindrical container body. The apparatus may include a mandrel having a generally cylindrical-shaped portion for movably supporting at least a portion of an interior surface of the container body. The apparatus further includes a lip-forming die assembly forming a part of the mandrel and having an annular cavity defining an open mouth portion and a closed bottom portion which defines a surface area extending generally radially outwardly of the mandrel outer surface and which is oriented with the open mouth portion generally transverse to an outer periphery of the container body and which faces the open end of the container body around the periphery. An axial forcing member contacts the other end of the container body for axially moving the container body along the outer surface of the mandrel and the container open end into and through the die assembly. The cavity bottom portion surface area of the lip-forming die assembly has a generally C-shaped cross-sectional contour in the direction of its outward extension which includes a combination of curved and straight sections positioned at predetermined radii and angles to a longitudinal axis of the container body, so that, when the outer periphery of the open end of the container body is forced into and through the die assembly to form the outwardly-rolled lip, the end of the container body will contact only a part of the bottom portion surface area of the die cavity to reduce frictional engagement and to minimize the force necessary to move the end of the container body through the die.

7 Claims, 2 Drawing Sheets

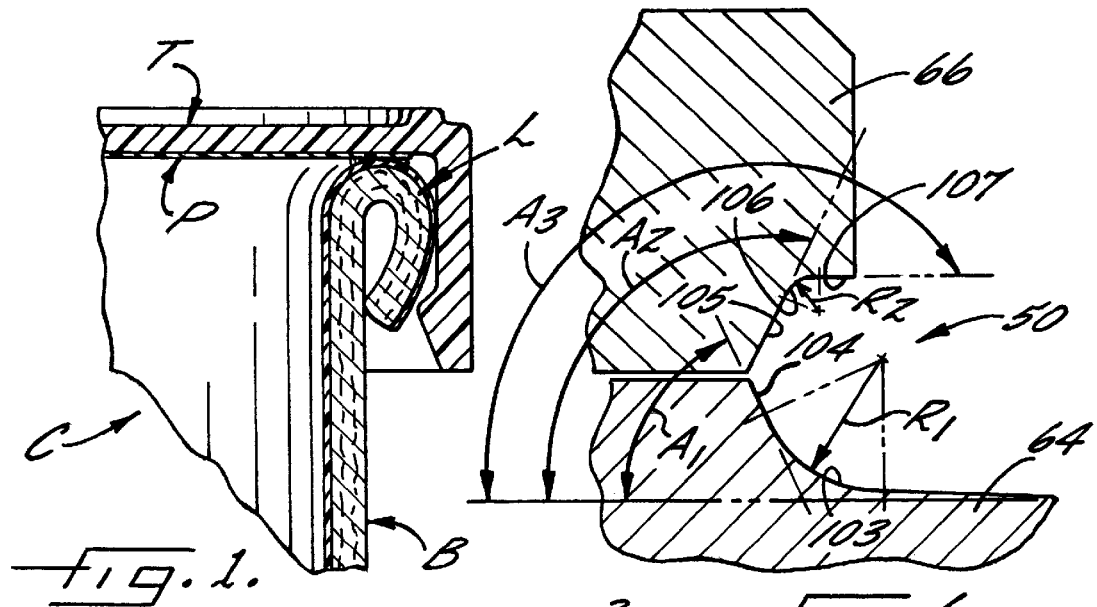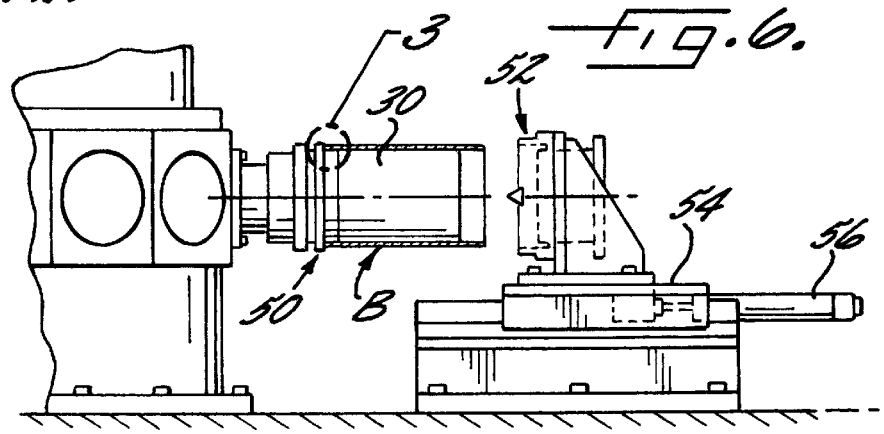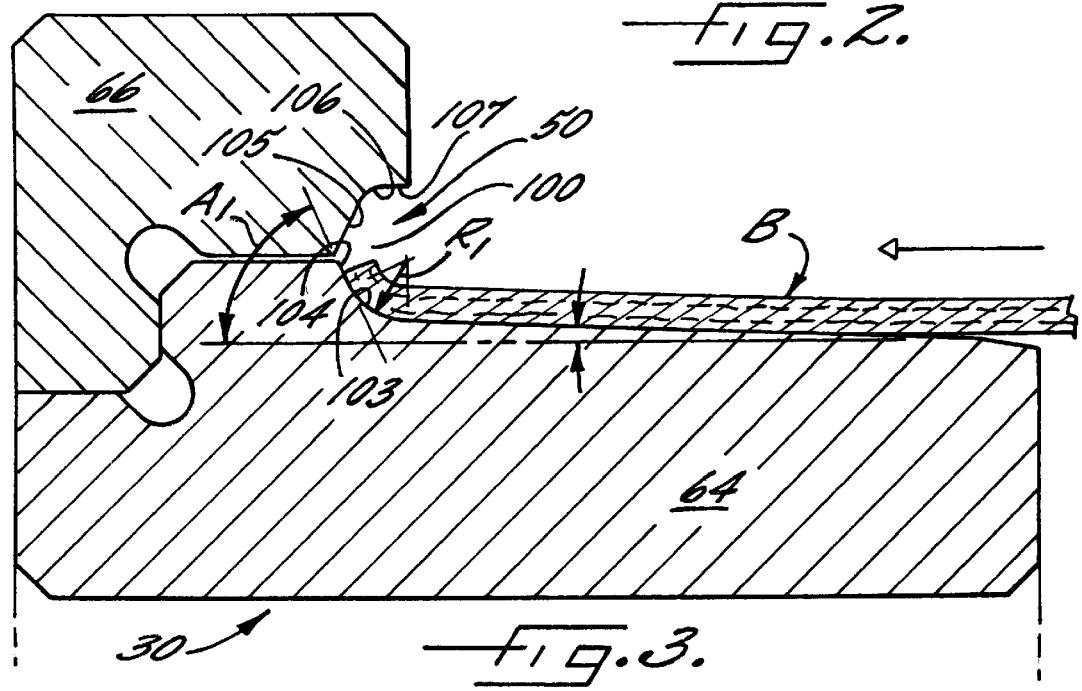

APPARATUS FOR FORMING AN OUTWARDLY-ROLLED LIP ON A CYLINDRICAL CONTAINER BODY

FIELD OF THE INVENTION

This invention is directed to an apparatus for forming an outwardly-rolled lip on an open end of a deformable container body and, more particularly, to an improved die utilized in such apparatus for outwardly rolling a lip on the deformable container body when an open end of the container body is forced into and through the improved die.

BACKGROUND OF THE INVENTION

Non-metallic containers have achieved widespread commercial acceptance. These containers include a body made from plastic, paperboard, or a layered structure such as one or more layers of paperboard having interior and/or exterior polymeric film or foil layers. Typically these container bodies are easier to manufacture, are less expensive, and/or are more environmentally acceptable than prior metal containers.

In cylindrical form, non-metallic containers include a separate closure member at one or both ends of the cylinder. In some instances, the closure member may be a metallic closure member which is joined to the container body by outwardly rolling a portion of the lip of the container into a metallic flange of the metal closure, which is then crimped into the container body structure. Alternatively a peelable lidding member can be attached directly to a container body by means of a thermal seal formed between an integral lip on the container body and the lidding member.

For plastic container bodies, an integral top flange or lip can readily be formed during the molding process. However, for paperboard container bodies, the lip-forming procedure is typically accomplished in a step separate from formation of the body, per se.

For relatively thin walled container bodies, such as convolutely wound, frustoconically-shaped container bodies or container bodies formed of thin walled thermoplastic materials, it has been proposed to form a lip on the upper end by employing an apparatus including a splined surface support member, as disclosed in U.S. Pat. No. 4,680,016 to Lynch. The container body is forced onto the frustoconical splined support and the open end is then forced axially into a semicircular annual groove which initially forms an outwardly folded rim. Thereafter, a tucking finger, mounted at a rimming station, rolls the outward fold into a rolled lip as the mandrel supporting the container body is rotated.

For relatively thick walled paperboard container bodies, for example, having a wall thickness greater than about 0.015", e.g. from 0.020 to 0.055", rolled lips are more difficult to form. Conventionally, such rolled lips have been formed employing a metal can flanger of the type used to flange a metal can. This flanging apparatus has been used because of the high wall strength of thick walled paperboard container bodies. High wall strength is particularly apparent in spirally wound bodies formed of multiple layers of paperboard with and without inner and/or outer layers of film and/or foil materials. In addition to high wall strength, these spirally wound bodies have a true cylindrical shape and thus the walls of the open end are not flared outwardly adding to difficulty in forming a rolled lip.

The separate operation to form a rolled lip on relatively thick walled container bodies employing a separate flanging apparatus is both time consuming and requires added material handling procedures for passing partially formed container bodies to and from the flanging apparatus. Moreover, the use of the conventional flanging apparatus is a relatively slow process and the flanging apparatus is expensive.

To overcome this problem, an apparatus was proposed by the assignee of the present invention and is disclosed and described in assignee's U.S. Pat. No. 5,431,619 to Bacon et al. The apparatus of this patent includes a mandrel having a cylindrical-shaped portion and a lip forming annular cavity positioned coaxially with and axially spaced from the cylindrical portion of the mandrel. The annular cavity has a generally semi-circular cross-section formed by a single predetermined radius and includes an open mouth and a closed bottom extending outwardly of the mandrel. The mandrel additionally includes a frustoconically-shaped portion between the cylindrical portion and the lip-forming die. The frustoconically-shaped portion tapers radially outwardly in the direction toward the lip-forming die. An axial forcing means forces a cylindrical container body axially along the mandrel toward the lip-forming die to thereby stretch and outwardly flare the open end thereof as it passes over the frustoconically-shaped portion and the flared end is then forced into the cavity and along the semi-circular surface of the bottom portion and is rolled outwardly to form the lip.

This apparatus greatly improved the prior lip-forming operations for container bodies of the type discussed above; however, this apparatus can cause breakdown of the container body when the force exerted by the axial forcing means to force the container body into, along the surface of the die bottom portion, and through the lip-forming die exceeds the crush strength of the container body material.

OBJECT AND SUMMARY OF THE INVENTION

Accordingly, it is the object of this invention to provide an improved die construction for use in an apparatus for forming an outwardly-rolled lip on an open end of a deformable container body wherein the force necessary to move the end of the container body through the die is minimized to overcome the above discussed problem.

By this invention, it has been found that the above object may be accomplished by providing an apparatus for forming an outwardly-rolled lip on an open end of a deformable cylindrical container body which includes generally the following.

A mandrel is provided which has a portion defining a generally cylindrical-shaped outer surface adapted for movably supporting at least a portion of an interior surface of the container body. A lip-forming die assembly forms part of the mandrel and has an annular cavity defining an open mouth portion and a closed bottom portion which defines a surface area extending generally radially outwardly of the mandrel outer surface and is adapted to be oriented with the open mouth portion generally transverse to an outer periphery of the container body and facing the open end of the container body around the periphery when positioned on the mandrel. An axial forcing member is adapted to contact the other end of the container body for axially moving the container body along the outside surface of the mandrel and the container body open end into and through the die assembly.

The cavity bottom portion surface area of the improved lip-forming die assembly of this invention has a generally C-shaped cross-sectional contour in the direction of its outward extension which includes a combination of curved and straight sections positioned at predetermined radii and angles to a longitudinal axis of the container body; so that, when the open end of the container body is forced into and through the die to form the outwardly-rolled lip, the end of the container body will contact only a portion of the bottom surface area of the die cavity to minimize the force necessary to move the end of the container body through the die.

While the improved lip-forming die assembly of the present invention is preferably utilized with an apparatus for forming an outwardly-rolled lip on an end of a deformable container body which includes a mandrel for supporting the interior surface of the container body, it has also been found that the improved die assembly of this invention may be utilized with other flangers or apparatus for forming an outwardly-rolled lip on an open end of a deformable container body which does not utilize a mandrel for supporting the interior surface of the container body, but instead inserts an open end of the deformable cylindrical container body directly into the die assembly.

BRIEF DESCRIPTION OF THE DRAWINGS

While some of the objects and advantages of this invention have been set forth above, other objects and advantages will become apparent from the detailed description of the invention set forth below, when taken in conjunction with the accompanying drawings, in which:

FIG. 1 is a sectional view through a portion of a deformable container having an outwardly rolled lip and including a typical top end closure thereon;

FIG. 2 is a side elevational view of an apparatus for forming an outwardly-rolled lip on an open end of a deformable cylindrical container body;

FIG. 3 is an enlarged sectional detail, taken generally within the circle 3 of FIG. 2 and illustrating the container body being moved along a mandrel of the apparatus and the open end thereof into and partially through a lip-forming die;

FIG. 6 is an enlarged sectional view of the annular cavity of the lip-forming die and illustrating particularly the predetermined radii and angles of the respective curved and straight sections of the cross-sectional contour thereof.

DETAILED DESCRIPTION OF THE PREFERRED EMBODIMENT OF THE INVENTION

Figure 4:
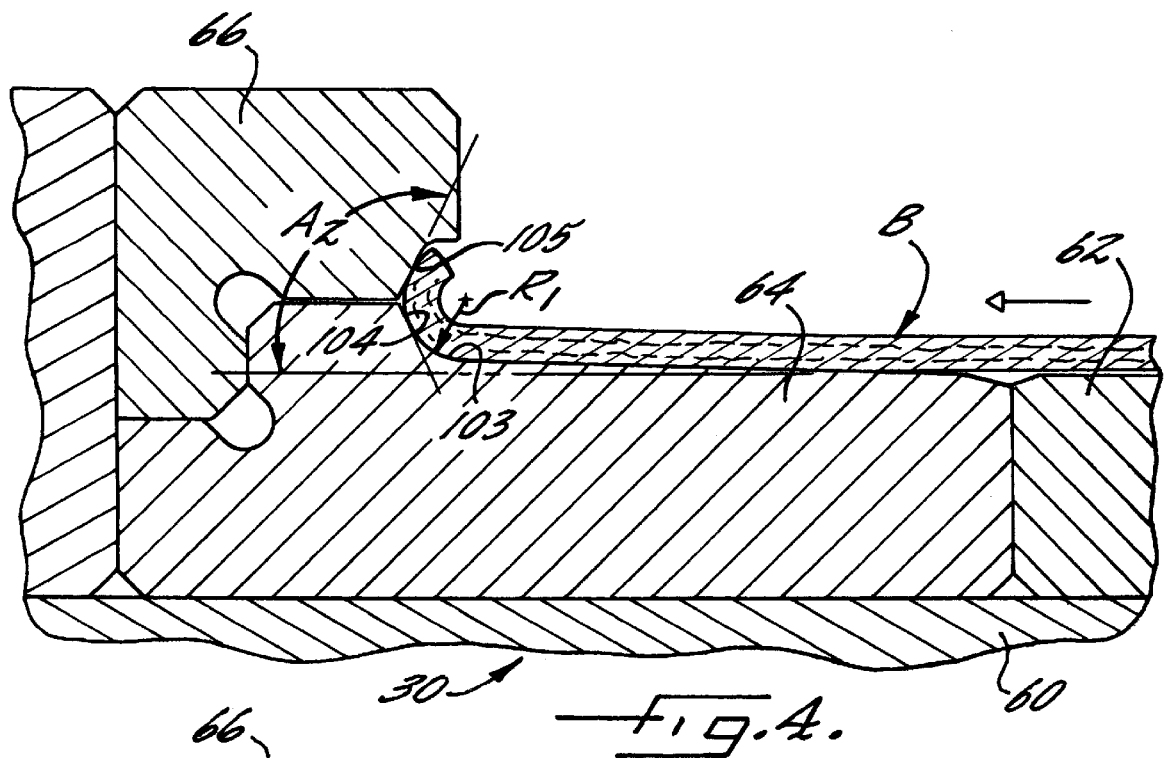
FIG. 4 is a view, like FIG. 3 illustrating a further stage of movement of the container body along the mandrel and the open end thereof into and through the lip-forming die.

Referring now to FIG. 1, there is partially illustrated therein a cross-section of one corner of a preferred container C which includes a container body B having an outwardly rolled lip L on an open end thereof. The container C also includes a typical peelable lidding member P and a flexible plastic top T which can be used to reseal the container C after removal of the peelable lidding member P. The container body B is typically a thick walled composite or paperboard laminate having a thickness greater than about 0.020". In the form illustrated in FIG. 1, the container body B typically is formed from one or more paperboard layers and also includes an interior film or film/foil liner. The interior liner generally includes a polymeric coating on the interior most surface thereof for thermal bonding to the interior of the peelable lidding member P. The outwardly-rolled lip L provides a surface at the top thereof for bonding the peelable lidding member P and additionally provides an exterior flange for gripping by a flanged edge of the flexible plastic top T.

The container body B is preferably formed by a conventional spiral winding process as will be well known to the skilled artisan. In general, such process involves wrapping one or more layers of continuous strip material around a stationary mandrel. Prior to winding of the layers, they are coated with adhesive material to ensure formation of a strong bond within the body wall. Generally, for container type structures, the inner-most layer is a film or film/foil laminate. To this layer is bonded one or more paperboard layers. The outer layer typically is a thin glossy paperboard layer and/or a film layer. The total body wall thickness is normally between about 0.015 and about 0.070", preferably between about 0.020 and about 0.055". The continuous paperboard and film or foil strips are wound around the mandrel to thereby form a continuous cylindrical tube which is cut into segments of the desired length at the discharge end of the mandrel to form container bodies B.

For forming of the outwardly-rolled lip on such cylindrical container bodies B, a turret-type container finishing machine may be utilized, as illustrated and described in assignee's above referenced '619 U.S. patent (the disclosure of which is herein incorporated by reference). As may be seen in such patent, one of the turret forming stations of the machine receives a pre-cut deformable cylindrical container body B and then performs various operations on the body for converting the body into containers. In such machine, an apparatus for forming an outwardly-rolled lip on the open end of the deformable container body B is provided, as illustrated generally in FIG. 2. As seen in this figure and in assignee's '619 U.S. patent, the lip-forming apparatus includes a mandrel body 30, a lip-forming annular die assembly 50 and an axial forcing member 52 for forcing the container body B longitudinally along the outside surface of the mandrel body 30 and into and through the lip-forming annular die assembly 50. The axial forcing member 52 is carried by a movable support 54 and is moved inwardly and outwardly by a motor means (not shown) which is attached to the support 54 by way of rod 56.

Figure 5:
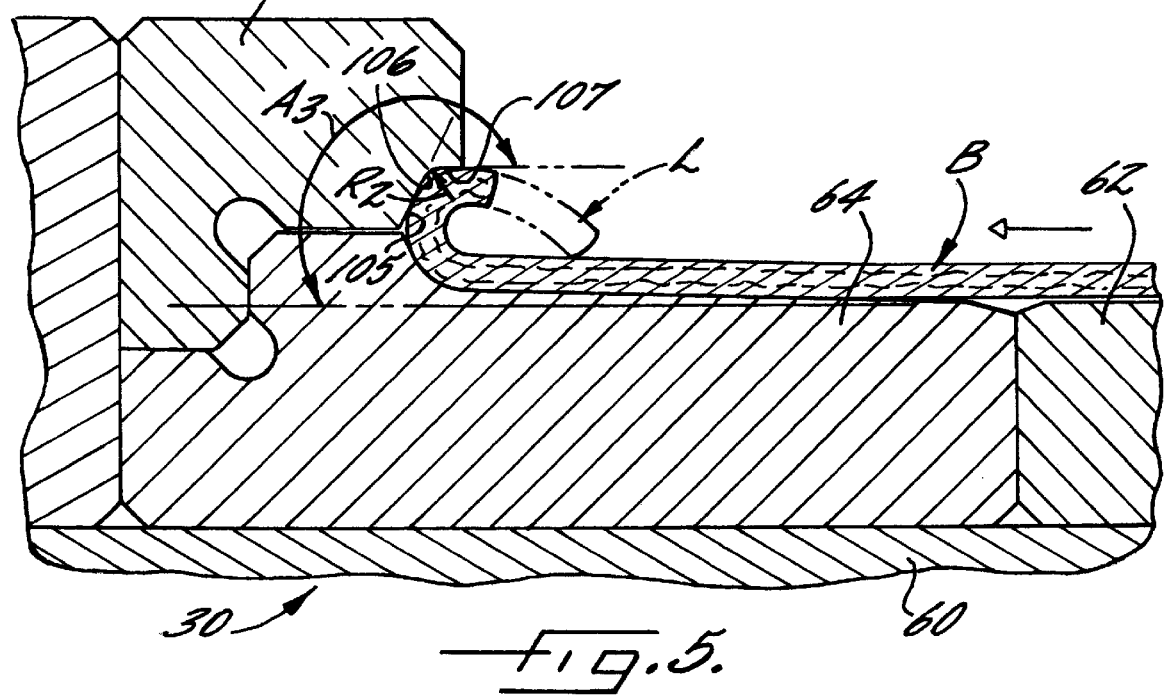
FIG. 5 is a view, like FIGS. 3 and 4, illustrating yet a further stage of movement of the container body along the mandrel and the open end thereof into and through the lip-forming die.

As more fully illustrated in assignee's '619 U.S. patent and which may be partially seen in FIGS. 4 and 5 hereof, the mandrel 30 is formed from a mandrel body support 60 which in turn supports a plurality of exterior sleeves including sleeves 62, 64, 66. Sleeve 62 has a generally cylindrical-shaped outer surface for movably supporting at least a portion of an interior surface of the container body B. Sleeve 64 has a frustoconically-shaped outer surface and is positioned coaxially with the mandrel sleeve 62 so as to receive the forward open end of the deformable cylindrical container body B as it is moved along the outside surfaces of the sleeve 62 and 64. Sleeve 66 is mounted radially on the sleeve 64 and cooperates with the sleeve 64 to define the lip-forming annular die assembly 50. The sleeves 62, 64, 66 could be arranged in any suitable manner to define the above discussed outer surfaces on the mandrel 30 and the lip-forming die 50. Reference may also be had to further details of a mandrel of this type as shown in assignee's above discussed '619 U.S. patent.

The lip-forming die assembly 50 has an annular cavity 100 which defines an open mouth portion and a closed bottom portion. The closed bottom portion defines a surface area composed of segments 103, 104, 105, 106, 107. This surface area 103, 104, 105, 106, 107 extends generally radially outwardly of the outer surface of the mandrel 30 and is adapted to be oriented with the open mouth portion generally transverse to an outer periphery of the container body B positioned on the mandrel 30 and facing the open end of the container body B around its outer periphery. The cavity bottom portion surface area 103, 104, 105, 106, 107 of the lip-forming die 50 has a generally C-shaped cross-sectional contour (as shown in FIGS. 3–6) in the direction of its outward extension and includes a combination of curved and straight sections defining the surface area segments 103, 104, 105, 106, 107 and positioned at predetermined radii and angles to a longitudinal axis X of the container body.

Preferably, such surface area includes a first curved section 103 which preferably has a radius R1 of approximately 0.074", a second straight section 104 extending from the first section 103 and preferably having an angle A1 of approximately 65°, a third straight section 105 extending from the second section 104 and preferably extending at a predetermined angle A2 of approximately 115°, a fourth curved section 106 extending from the third section 105 and preferably at a predetermined radius R2 of approximately 0.020", and a fifth straight section 107 extending from the fourth section 106 and preferably positioned at a predetermined angle of approximately 180°. Preferably, the cavity bottom portion surface area and the first, second, third, fourth and fifth sections 103, 104, 105, 106, 107 thereof extend for approximately 180° and the first curved section 103 and the fourth curved section 106 each extend for approximately 65°.

With this arrangement, the leading end of the container body B is forced along the outer surface of the mandrel 30 and the sleeves 62, 64 by the axial forcing member 52 (as more fully described in assignee's above discussed '619 U.S. patent). As the leading open end of the container body B is forced along the sleeve 64 of the mandrel 30 which has an outwardly extending frustoconically-shaped outer surface, the leading end of the container body B is outwardly stretched so as to flare such end. The end is then received in the lip-forming die assembly 50 and the annular cavity 100 thereof. The outwardly flared leading end is first forced through the first curved section 103 of the cavity bottom portion surface area to begin forming the outwardly-rolled lip L on the container body B (as shown in FIG. 3). The container body B is further forced through the lip-forming die assembly 50 and the annular cavity 100 thereof and along the second and third sections 104, 105 of the bottom portion surface area (as shown in FIG. 4). The open end of the container body B is then forced through the fourth and fifth sections 106, 107 of the bottom portion surface area of the annular cavity 100 of the lip-forming die assembly 50 to complete formation of the outwardly-rolled lip L on the container body B (as shown in FIG. 5).

As clearly shown in these FIGS. 3–5, the combination of curved and straight sections 103, 104, 105, 106, 107 of the surface area of the closed bottom portion of the annular cavity 100 of the lip-forming die assembly 50 causes the flared open end of the body portion B to only contact a part of the surface area of the closed bottom portion of the annular cavity 100 to reduce frictional contact and minimize the force necessary to move the end of the container body B through the lip-forming die 100 as compared with the smooth curved surface area and continuous frictional contact of the closed bottom portion of the annular cavity of the lip-forming die of assignee's prior above discussed '619 U.S. patent.

While the preferred embodiment of a die assembly 50 for forming an outwardly-rolled lip L on an open end of a deformable cylindrical container body B has been illustrated and described for use with an apparatus including a mandrel 30 for supporting the interior of the container body B during lip-forming operation, the improved lip-forming annular die assembly 50 of this invention can also be utilized with other more conventional flanger or lip-forming devices which do not utilize a support mandrel therein. Also, as described above, the improved lip-forming assembly 50 of this invention is preferably formed utilizing multiple sleeves 64, 66 which allows replacement of one or more of the sleeves 64, 66 for changing of the preferred radiuses and angles of the sections 103, 104, 105, 106, 107 which define the surface area of the annular cavity 100, when other types or sizes of cylindrical container bodies are being utilized with the lip-forming die assembly 50.

The invention has been described in considerable detail with reference to its preferred embodiment. However, it will be apparent that numerous modifications and variations can be made within the spirit and teachings of the invention as described in the foregoing detailed specification and as defined in the following claims.

What is claimed is:

1. An apparatus for forming an outwardly-rolled lip on an open end of a deformable cylindrical container body, said apparatus comprising:

a mandrel having a portion defining a generally cylindrical-shaped outer surface adapted for movably supporting at least a portion of an interior surface of the container body;

a lip-forming die assembly forming a part of said mandrel and having an annular cavity defining an open mouth portion and a closed bottom portion which defines a surface area extending generally radially outwardly of said mandrel outer surface and adapted to be oriented with said open mouth portion generally transverse to an outer periphery of a container body positioned on said mandrel and facing the open end of the container body around the outer periphery;

an axial forcing member adapted to contact the other end of the container body positioned on said mandrel for axially moving the container body along said outer surface of said mandrel and the container open end into and through said die assembly; and said cavity bottom portion surface area of said lip-forming die assembly having a generally C-shaped cross-sectional contour in the direction of its outward extension which includes a combination of curved and straight sections positioned at predetermined radii and angles to a longitudinal axis of the container body and in the direction of its outward extension comprises a first curved section, a second straight section extending from said first section, a third straight section extending from said second section, a fourth curved section extending from said third section, and a fifth straight section extending from said fourth section, so that, when the outer periphery of the open end of the container body is forced into and through said die assembly to form the outwardly-rolled lip, the end of the container body will contact only a portion of said bottom portion surface area of said die cavity to minimize the force necessary to move the end of the container body through said die assembly.

2. An apparatus, as set forth in claim 1, in which said mandrel further includes a portion having a frustoconically-shaped outer surface and positioned between said mandrel portion having a cylindrical-shaped outer surface and said lip-forming die assembly and tapering outwardly toward said die and adapted to receive the interior surface of the container body thereon for outwardly stretching and flaring the open end of the container body as the open end of the container body is moved along the outer surface of said mandrel and into and through said die assembly.

3. An apparatus, as set forth in claim 1, in which said first curved section has a predetermined radius of approximately 0.074", said second straight section is at a predetermined angle of approximately 65°, said third straight section is at a predetermined angle of approximately 115°, said fourth curved section has a predetermined radius of approximately 0.020", and said fifth straight section is at a predetermined angle of approximately 180°.

4. An apparatus, as set forth in claim 3, in which said cavity bottom portion surface area and said first, second, third, fourth and fifth sections thereof extend for approximately 180° and said first curved section and said fourth curved section each extend for approximately 65°.

5. A die assembly for forming an outwardly-rolled lip on an open end of a deformable cylindrical container body adapted to be moved axially into and through said die assembly;

said die assembly having an annular cavity adapted to be positioned coaxially with the container body and having an open mouth portion and a closed bottom portion defining a surface area adapted to extend generally radially outwardly of the container body and adapted to be oriented with said open mouth portion generally transverse to an outer periphery of the container body and facing the open end of the container body around the outer periphery, said cavity bottom portion surface area having a generally C-shaped cross-sectional contour in the direction of its outward extension which includes a combination of curved and straight sections positioned at predetermined radii and angles to a longitudinal axis of the container body and in the direction of its outward extension comprises a first curved section, a second straight section extending from said first section, a third straight section extending from said second section, a fourth curved section extending from said third section, and a fifth straight section extending from said fourth section;

so that, when the outer periphery of the open end of the container body is forced into and through said die assembly to form the outwardly-rolled lip, the end of the container body will contact only a part of said bottom portion surface area of said die cavity to reduce frictional contact and to minimize the force necessary to move the end of the container body through said die assembly.

6. A die assembly, as set forth in claim 5, in which said first curved section has a predetermined radius of approximately 0.074", said second straight section is at a predetermined angle of approximately 65° , said third straight section is at a predetermined angle of approximately 115°, said fourth curved section has a predetermined radius of approximately 0.020", and said fifth straight section is at a predetermined angle of approximately 180°.

7. A die assembly, as set forth in claim 6, in which said cavity bottom portion surface area and said first, second, third, fourth and fifth sections thereof extend for approximately 180° and said first curved section and said fourth curved section each extend for approximately 65°.

\* \* \* \* \*